(12) United States Patent
Fang et al.

(10) Patent No.: US 11,708,933 B2
(45) Date of Patent: Jul. 25, 2023

(54) PIPELINE RADAR AND TELEVISION INSPECTION ROBOT

(71) Applicants: Zhengzhou University, Henan (CN); WELEAD Infrastructure Engineering Technology (Zhengzhou), Ltd., Henan (CN)

(72) Inventors: Hongyuan Fang, Henan (CN); Peng Zhao, Henan (CN); Bin Li, Henan (CN); Jianwei Lei, Henan (CN); Chengchao Guo, Henan (CN); Yanhui Pan, Henan (CN); Haijun Li, Henan (CN); Wei Wu, Henan (CN); Zongsheng Lu, Henan (CN)

(73) Assignees: Zhengzhou University, Henan (CN); WELEAD Infrastructure Engineering Technology (Zhengzhou), Ltd., Henan (CN)

( * ) Notice: Subject to any disclaimer, the term of this patent is extended or adjusted under 35 U.S.C. 154(b) by 407 days.

(21) Appl. No.: 17/030,404

(22) Filed: Sep. 24, 2020

(65) Prior Publication Data
US 2021/0010628 A1     Jan. 14, 2021

(30) Foreign Application Priority Data
Feb. 24, 2020 (CN) .......................... 202010111474.9

(51) Int. Cl.
F16L 55/40     (2006.01)
F16L 55/32     (2006.01)
(Continued)

(52) U.S. Cl.
CPC ............... F16L 55/40 (2013.01); B25J 5/007 (2013.01); E21B 4/16 (2013.01); F16L 55/32 (2013.01); F16L 2101/30 (2013.01)

(58) Field of Classification Search
CPC ....... F16L 55/40; F16L 55/32; F16L 2101/30; B25J 5/007; E21B 4/16; F17D 5/02; F17D 5/00
See application file for complete search history.

(56) References Cited

U.S. PATENT DOCUMENTS

2004/0173116 A1 * 9/2004 Ghorbel .................. F16L 55/36
73/866.5

FOREIGN PATENT DOCUMENTS

CN     203309524 U  * 11/2013  ............... F17D 5/00
CN     207283567 U  *  4/2018  ............... H04K 3/00
(Continued)

*Primary Examiner* — Herbert K Roberts
*Assistant Examiner* — Anthony W Megna Fuentes

(57) ABSTRACT

The present application discloses a pipeline radar and television inspection robot which includes a robot body, a directional drilling lifting device, a directional drilling rotary device, a directional drilling swing device, a radar, cameras and a driving apparatus; wherein the directional drilling lifting device is on a front part of the robot body; the directional drilling rotary device is on the directional drilling lifting device; the directional drilling swing device is on the directional drilling rotary device; the radar and the cameras are on the directional drilling swing device; the driving apparatus are on a bottom of the robot body. The directional drilling lifting device, the radar and the cameras are plugged in the robot body. The robot body electrically connects to cables which electrically connect to a control system. The cameras and the radar are able to be adjusted and the components are connected as modules.

1 Claim, 10 Drawing Sheets

(51) Int. Cl.
  *B25J 5/00*   (2006.01)
  *E21B 4/16*   (2006.01)
  *F17D 5/02*   (2006.01)
  *F17D 5/00*   (2006.01)
  *F16L 101/30*   (2006.01)

(56) References Cited

FOREIGN PATENT DOCUMENTS

| CN | 108908287 A | * | 11/2018 | ............ | B25J 11/008 |
| CN | 109093653 A | * | 12/2018 | .............. | B25J 19/06 |
| WO | WO-2009011682 A1 | * | 1/2009 | ................ | A61F 2/54 |
| WO | WO-2010098205 A1 | * | 9/2010 | ................ | B60B 1/06 |

* cited by examiner

PIPELINE RADAR AND TELEVISION INSPECTION ROBOT

CROSS REFERENCE OF RELATED APPLICATION

This application claims priority under 35 U.S.C. 119(a-d) to CN 202010111474.9, filed Feb. 24, 2020.

BACKGROUND OF THE PRESENT INVENTION

Field of Invention

The present invention relates to pipeline inspection field, and more particularly to a pipeline radar and television inspection robot.

Description of Related Arts

The pipeline radar and television inspection robot is an endovision camera inspection device for pipeline, which is widely applied in military, electric power, thermal power plant, petrochemical, nondestructive testing, water supply and drainage, archaeology and so on. The pipeline radar and television inspection robot is able to rapidly inspect and diagnose the inside structure of the pipelines. Conventionally, the endovision camera inspection device is mainly for detecting the structural defects inside the pipeline, such as cracks, deformation, displacement, disconnection, etc., and functional defects, such as sediment, structure, obstacles, tree root, etc.

Urban underground pipelines are critical for urban residents' daily life, among which the drainage pipes occupy the most pipe miles and are easily damaged. The damaged drainage pipes are the main reason for urban underground cavity and ground collapse accident, so the regular maintenance of the drainage pipes is significant for improving safety factor, quality of life of urban resident, and reducing the possibility of the secondary disaster.

The conventional pipeline radar and television inspection robot is mainly for detecting the structural and functional defects inside the pipeline. The outside environment of the drainage pipelines deep in the ground is conventionally detected by ground penetrating radars which adopt high frequency radio to inspect the distribution pattern inside the media. The ground penetrating radars decide the compositions of the media by the way the electromagnetic pulse propagating in the media. The ground penetrating radars adopt electromagnetic radiation for inspection. The electromagnetic radiation is easily disturbed by the combination of permittivity, conductivity and permeability.

The drainage pipes are deep under the ground where the environment changes rapidly. The humidity on the ground impacts the permittivity, which greatly compromise the inspection result. The accuracy of applying ground penetrating radars in underground pipeline inspection is not able to be guaranteed. The required information such as the loose earth around the underground pipeline, the cavity formed by the flow of water leakage is not able to be obtained. A pipeline radar inspection robot which is able to detect the outside environment of the underground pipeline while walking inside the pipeline is in pressing need.

Chinese patent CN201920060846.2 disclosed a ship-shaped underground sewage pipeline detection robot. Ship comprising a robot body, wherein the communication connector quick release box is arranged in a box of the robot body; the obstacle avoidance radar is arranged at the front end of the communication connector quick release box and is used for avoiding obstacles; the propeller is arranged at the rear end of the communication connector quick release box and used for driving the ship body to advance; the transparent cover is buckled on the communication connector quick release box; the collection protection cavity is formed by the transparent cover and the communication connector quick release box; the camera is fixed on the communication connector quick release box, arranged in the collection protection cavity and capable of rotating at all angles, and the three groups of high-definition cameras are uniformly distributed on the communication connector quick release box in the direction perpendicular to the advancing direction of the ship body, used for shooting images of the inner wall of the underground sewage pipeline and arranged in the collection protection cavity.

The above-mentioned ship-shaped underground sewage pipeline detection robot adopts a system in which cameras are carried by the robot and a radar is for inspecting the pipeline. The cameras and the radar are not able to be adjusted while the robot is operating. The components of the robot are not module connection. The robot is not able to operate in a complicated environment.

SUMMARY OF THE PRESENT INVENTION

An object of the present invention is to provide a pipeline radar and television inspection robot, the cameras and radar on which are able to be adjusted. The components of the robot adopt module connects. The robot is able to operate in complicated environment.

In order to fulfill the above mentioned object the present invention provide a pipeline radar and television inspection robot, comprising: a robot body, a directional drilling lifting device, a directional drilling rotary device, a directional drilling swing device, a radar, cameras and a driving apparatus; wherein the directional drilling lifting device is on a front part of the robot body; the directional drilling rotary device is on the directional drilling lifting device; the directional drilling swing device is on the directional drilling rotary device; the radar and the cameras are on the directional drilling swing device; the driving apparatus are on a bottom of the robot body;

wherein the directional drilling lifting device is plugged in the robot body by a first quick disconnect waterproof aviation female plug and male panel socket;

wherein the radar and the cameras are plugged in the robot body by a second quick disconnect waterproof aviation female plug and male panel socket; the robot body electrically connects to cables which electrically connect to a control system.

The radar comprises a radar antenna rear cover, a radar data acquisition board, a power supply board, a radar transmitter, a radar receiver, a radar detector, an antenna cover, an antenna base, a rear antenna base and a metal cable fixed head. The radar data acquisition board, the power supply board, the radar transmitter and the radar receiver are settled inside the radar antenna rear cover. The rear antenna base is connected to the radar antenna rear cover by screws. The metal cable fixed head is settled on the radar antenna rear cover. A radar detector is settled inside the antenna base. The antenna cover is connected to the antenna base by screws. The antenna base is connected to the rear antenna base by screws.

The robot is able to inspect the pipeline with a diameter not less than DN300 mm. The robot is able to accurately target the defects inside the pipe. While operation, the robot is able to walk with a maximum speed of 1 m/s and the speed is able to be adjusted with continuous variable. The maximum obstacle climbing ability reaches 35 mm without difficulty.

The cameras comprise camera shells, lens locking screw nut, tempered glass, lights and rear camera base. The tempered glass is placed ahead of the camera shell. The lens locking screw nut is on the front of the camera shells for locking the tempered glass. The lights are on the left and right side of the camera shell and are fixed by the screws. The rear of the camera shell is settled and connected to the rear camera base by screws.

The cameras comprise high-resolution web camera (20× optical zoom) and CREE high brightness cold shadowless light, the two of which are adjusted to an ideal position to provide enough luminance for the cameras to shoot every corner inside of the pipeline. The cameras, lights and control panel are connected by quick disconnect waterproof aviation female plug and male panel socket, which are able to be replaced by different cameras components according to the situation of the pipelines.

Furthermore, the robot body is filled with noble gases; a pressure sensor is inside the robot body; the pressure sensor electrically connects to the control system by the cable. A unitized mechanical seal is adopted to create and maintain a good sealing effect. The pressure sensor is able to detect the air pressure inside the robot body and the directional drilling lifting device. The pressure sensor is also able to detect the air pressure inside the robot chassis in real time. When the pressure of the noble gases is out of range and is detected by the pressure sensor, the change in pressure inside the pipe is able to be detected and controlled by the control system to a certain degree. The safety of the robot inside the underground pipeline is thus guaranteed. The explosion and water invading are prevented.

Furthermore, a tilt sensor is inside the robot body; the tilt sensor electrically connects to the control system by the cable. The tilt sensor is able to detect the inclination of the robot body and analysis the angle of inclination by the control system. The robot body is able to be adjusted before the overturn in time to prevent an overturn of the robot body.

Furthermore, a safety ring for obstacle avoidance is on a rear part of the robot body. The safety ring for obstacle avoidance prevents the robot from hitting on the obstacles while moving backward and damages to the components on the robot. The safety ring is the bearing point for the drag force of the cable, which prevent the damages and intermittent communication caused by the drag force on the cable.

Furthermore, a cable clamp is on the safety ring for obstacle avoidance; the cable goes through and is fixed in the cable clamp. The cable clamp further comprises a first clamping plate and a second clamping plate; a through hole is formed when the first clamping plate pressed together with the second clamping plate; the cable is pressed inside the through hole and goes thought the first clamping plate and the second clamping plate. The cable is fixed and intermittent communication caused by dragging the cable is avoided.

Furthermore, the safety ring for obstacle avoidance is connected to the cable clamp by a locking device. A groove is on the first clamping plate. An opening of the groove is connected by screw bolt or a latch. The first clamping plate fits in the safety ring for obstacle avoidance by the groove and is fastened on the safety ring by the screw bolt or the latch. The cable clamp is thus connected to the safety ring for obstacle avoidance.

A lifting ring is on the front of the robot body and is rotatable. The directional drilling lifting device is on the lifting ring and is rotatable. The lifting ring is adjustable to fix on the robot body by the rotating bolt.

Furthermore, the driving apparatus comprises at least two motors and at least four driving wheels; the motors and driving wheels are places on two sides of the robot body; a differential drive is formed by driving wheels placed on the two sides of the robot body when the motors drive the respective driving wheels; The two motors are both high power and torque. The motors drive bevel gear transmission mechanism. The chain transmission mechanism rotates to drive the driving wheels on the two sides of the robot body to rotate and walk. The two motors are controlled independently to realize differential drive and enable the robot to turn on the spot.

Furthermore, each of the driving wheels comprises an aluminum main body face of which is filled with protection sleeve which adopts PU pouring and natural rubber to prevent erosion, and improve acid and alkali resistance and endurance.

Furthermore, rounded angles are chamfered the driving wheels on a far end of the robot body. The curved faces of the rounded angle tightly fit the curve of the pipeline.

The benefits of the present invention compared to the conventional technology are as follow.

The directional drilling lifting device further comprises a four-bar linkage connected in a loop, and a first motor; wherein one end of the four-bar linkage is connected to the robot body; the first motor is plugged in the robot body by the first quick disconnect waterproof aviation female plug and male panel socket. The first motor drives the four-bar linkage to complete a lifting motion. The directional drilling rotary device further comprises a planetary gear which is mounted and revolves around a second motor; the second motor is set on the four-bar linkage; the second motor electrically connects to the robot body. The second motor drives the planetary gear to complete a rotary motion. The directional drilling swing device further comprises a worm and worm wheel mechanism which is connected to a third motor and is able to transmit force; the third motor is connected to a movable arm of the planetary gear; the third motor electrically connects to the robot body. The third motor drives the worm and worm wheel to complete a swing from left to right. The radar and cameras are settled on the worm and worm wheel mechanism, so the radar and cameras are able to be lifted, rotate and swing. The camera inside the tube can detect the disease around the tube in all directions. The robot is able to operate in complicated situations.

The directional drilling lifting device, the radar and the cameras are connected by the first quick disconnect waterproof aviation female plug and male panel socket and the second quick disconnect waterproof aviation female plug and male panel socket as modules, which simplifies the assembly.

The present invention is uniformly controlled by the control system which is able to be a PC or other control devices.

BRIEF DESCRIPTION OF THE DRAWINGS

In order to better illustrate the embodiments of the present invention or the conventional technology, a simple description of the drawings are provided below. Obviously, the figures are just for embodiments of the present invention. For a skilled in the art, other drawings based on the structures disclosed by the drawings in the present invention are able to be acquired without innovative effort.

DETAILED DESCRIPTION OF THE PREFERRED EMBODIMENT

Figure 1:
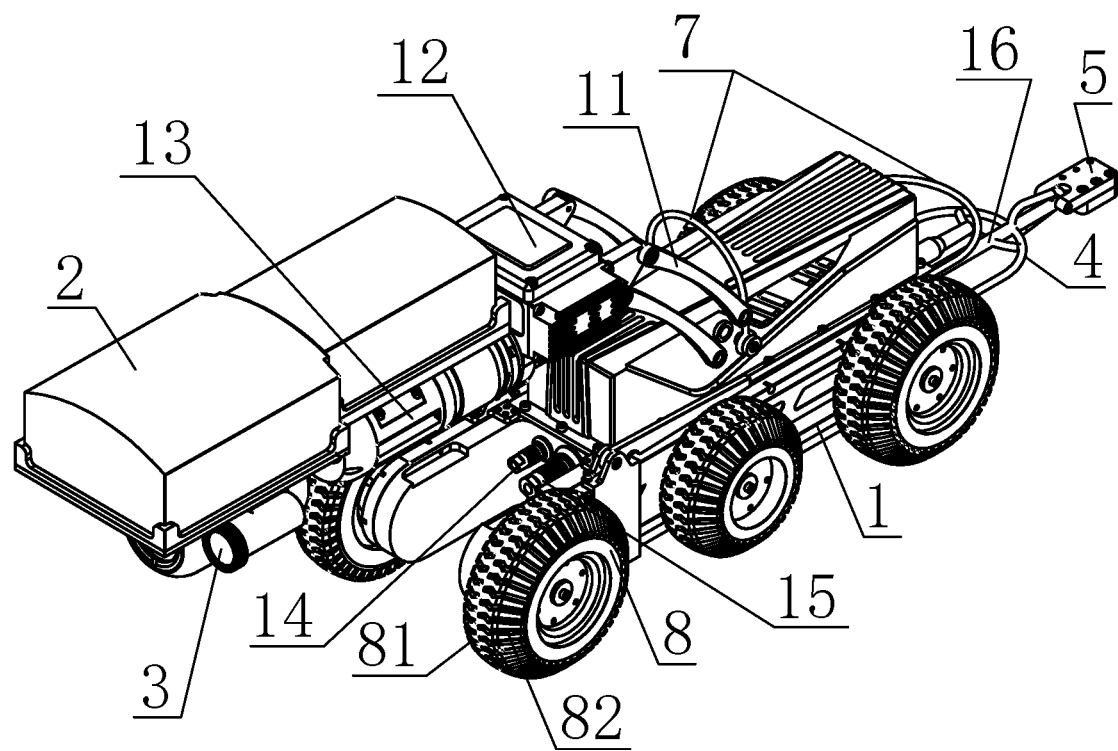
FIG. 1 is a perspective view of a pipeline radar and television inspection robot of the present invention.

Referring to the drawings, the technical solutions adopted by the embodiments are illustrated clearly and explained in detail. The illustrated embodiments are part of the embodiments of the present invention. Other embodiments based on the present invention developed by a skilled in art without innovative efforts are within the protection scope of the present invention.

The words such as 'top', 'bottom', 'left', 'right', 'front', 'rear' and so on are just for indicating the relative position and motions of the components shown in the drawings when the robot is in a certain posture. A new set of words will be adopted when the robot is in a new posture.

Except for specific limitation, the terminologies in the present invention such as 'connect', 'fix' and so on describe multiple situations. The word 'fix' is able to be used for fixation, assembly or a formation to one body. The word 'connect' is used for mechanical connection or electrical connection, in which the connection is able to be direct connection or connection by a media. The word is also able to describe the connection inside two components or interactions between the two components. A skilled in the art is able to understand the specific situation described by the terminologies.

Figure 2:
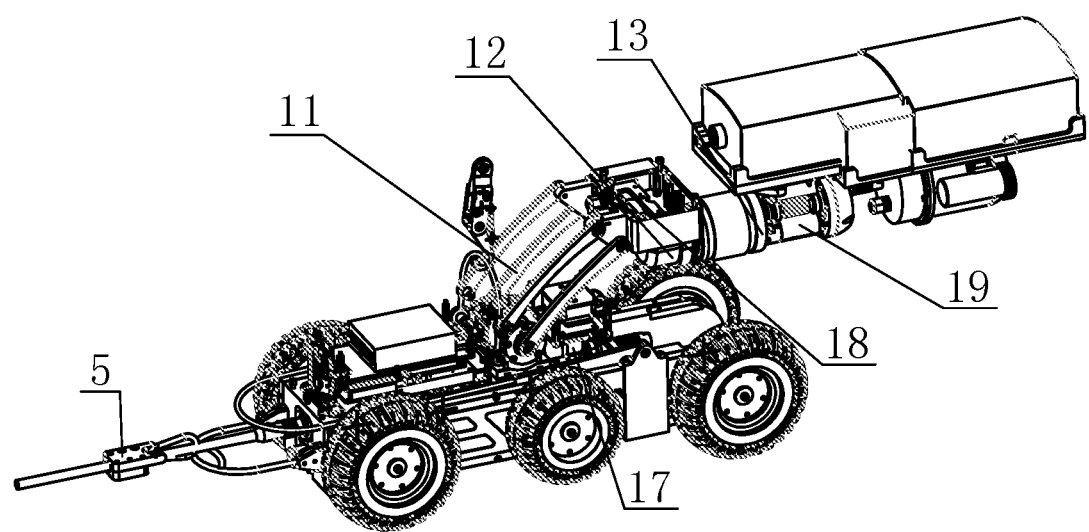
FIG. 2 is a perspective view of the pipeline radar and television inspection robot of the present invention from a new angle.
Figure 3:
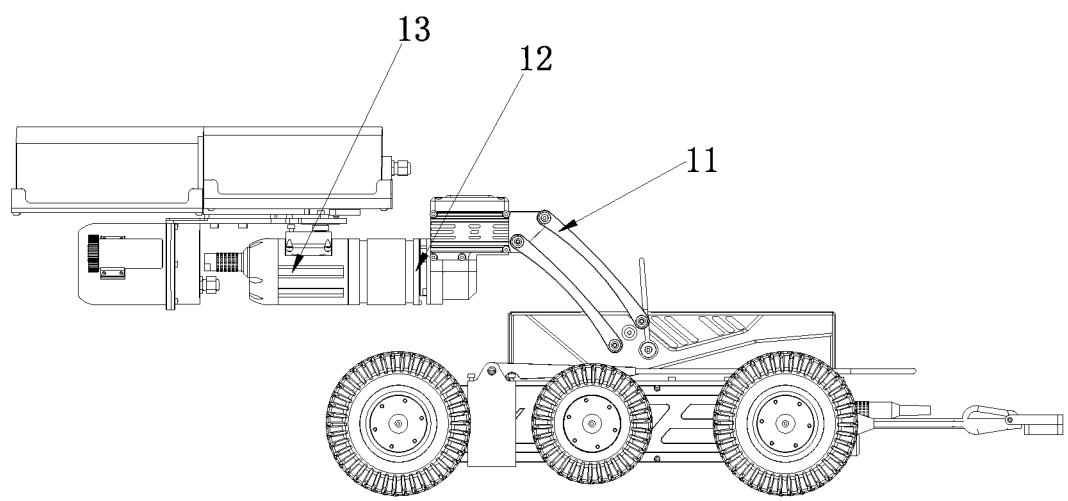
FIG. 3 is a front view of the pipeline radar and television inspection robot of the present invention.
Figure 4:
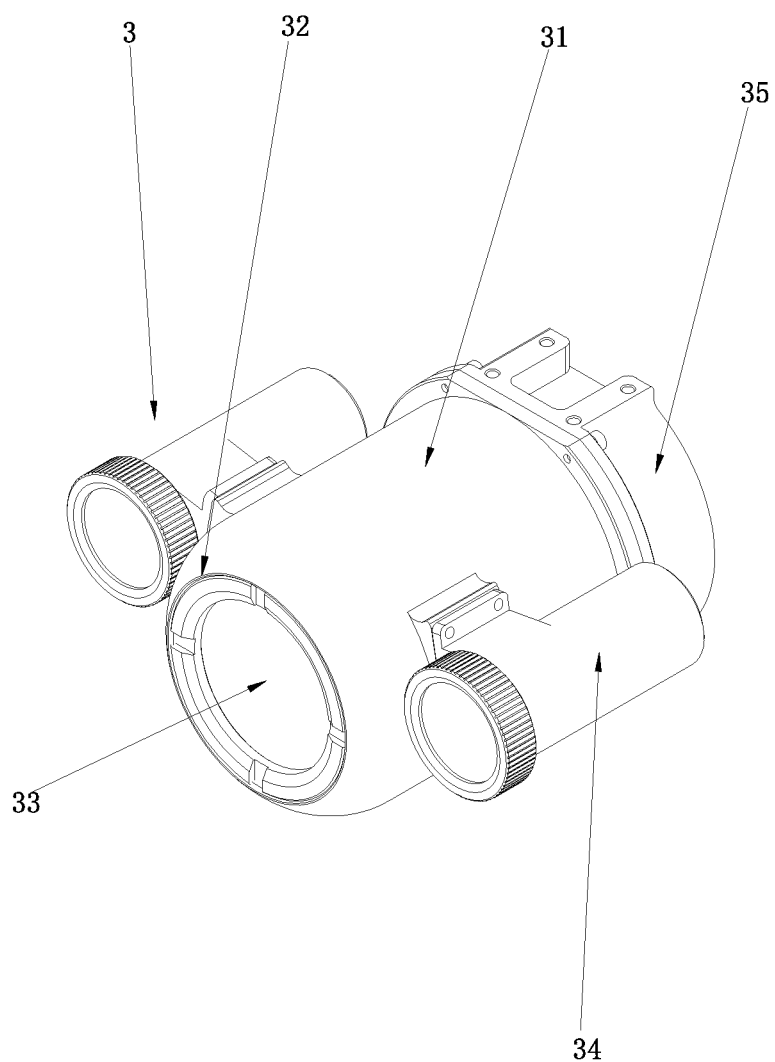
FIG. 4 is a structure drawing of a camera of the pipeline radar and television inspection robot.
Figure 5:
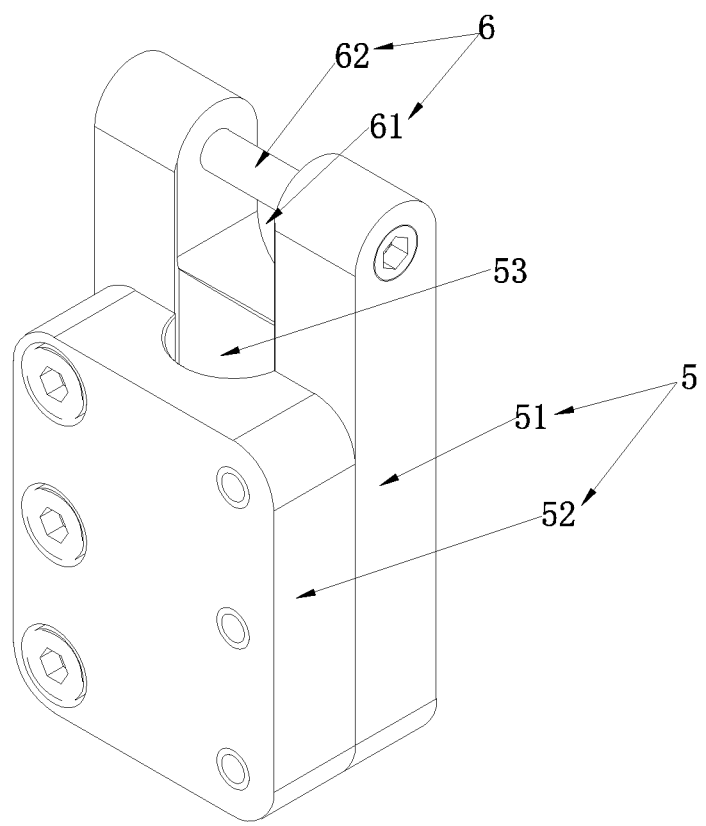
FIG. 5 is a structure drawing of a cable clamp of the pipeline radar and television inspection robot.
Figure 6:
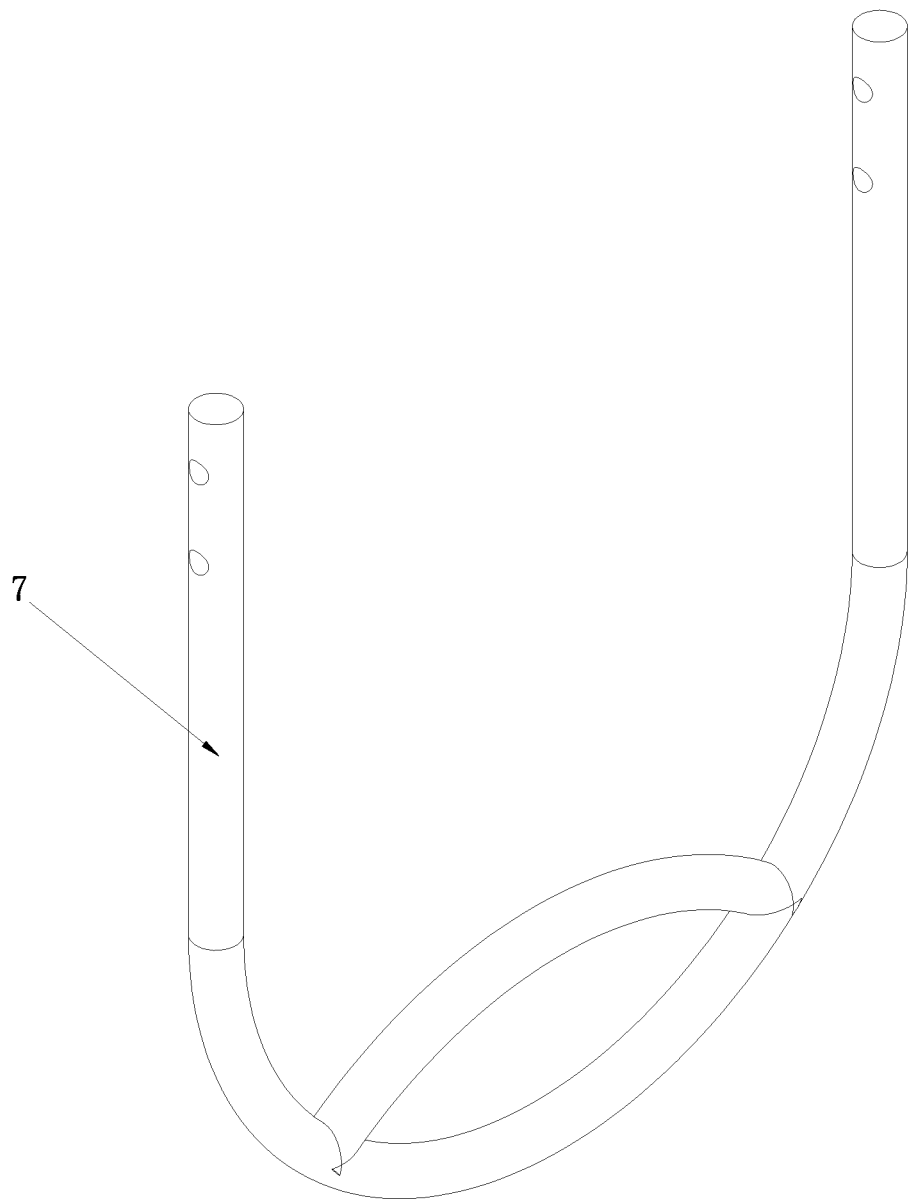
FIG. 6 is a structure drawing of a lifting ring of the pipeline radar and television inspection robot.
Figure 7:
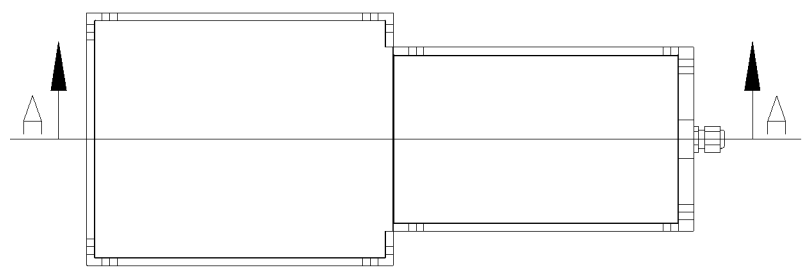
FIG. 7 is a structure drawing of a radar of the pipeline radar and television inspection robot.
Figure 8:
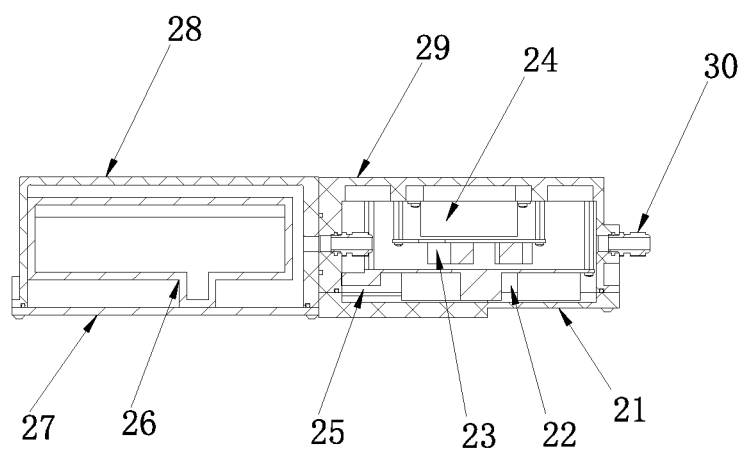
FIG. 8 is a sectional view across A-A in the FIG. 7.
Figure 9:
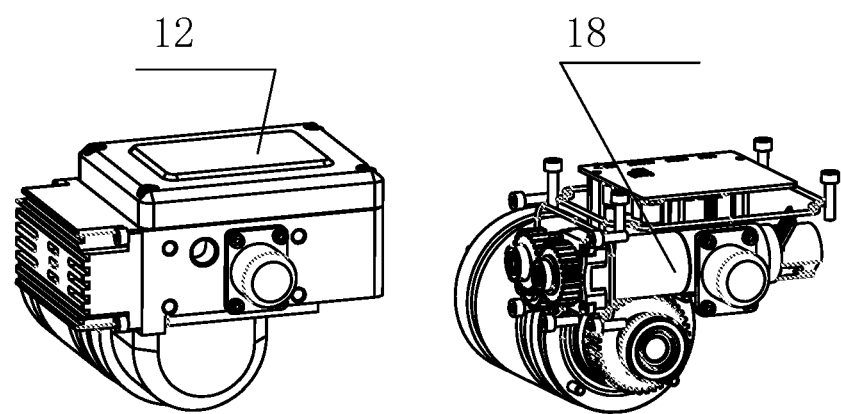
FIG. 9 is an exploded view of a rotary device.
Figure 10:
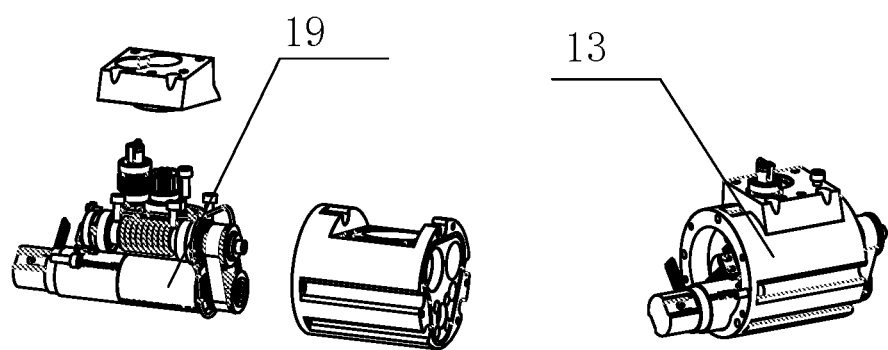
FIG. 10 is an exploded view of directional drilling swing device.

Referring to FIG. 1 to FIG. 8, a pipeline radar and television inspection robot, comprising: a robot body 1, a directional drilling lifting device 11, a directional drilling rotary device 12, a directional drilling swing device 13, a radar 2, cameras 3 and a driving apparatus; wherein the directional drilling lifting device 11 is on a front part of the robot body 1; the directional drilling rotary device 12 is on the directional drilling lifting device 11; the directional drilling swing device 13 is on the directional drilling rotary device 12; the radar 2 and the cameras 3 are on the directional drilling swing device 13; the driving apparatus are on a bottom of the robot body 1;

wherein the directional drilling lifting device is plugged in the robot body lby a first quick disconnect waterproof aviation female plug and male panel socket 14;

wherein the radar 2 and the cameras 3 are plugged in the robot body by a second quick disconnect waterproof aviation female plug and male panel socket 15; the robot body 1 electrically connects to cables 16 which electrically connect to a control system.

In the present embodiment, the directional drilling lifting device 11 further comprises a four-bar linkage connected in a loop, and a first motor 17; wherein one end of the four-bar linkage is connected to the robot body 1; the first motor 17 is plugged in the robot body 1 by the first quick disconnect waterproof aviation female plug and male panel socket 14. The first motor 17 drives the four-bar linkage to complete a lifting motion. The directional drilling rotary device 12 further comprises a planetary gear which is mounted and revolves around a second motor 18; the second motor 18 is set on the four-bar linkage; the second motor 18 electrically connects to the robot body 1. The second motor 18 drives the planetary gear to complete a rotary motion. The directional drilling swing device 13 further comprises a worm and worm wheel mechanism which is connected to a third motor 19 and is able to transmit force; the third motor 19 is connected to a movable arm of the planetary gear; the third motor 19 electrically connects to the robot body 1. The third motor 19 drives the worm and worm wheel to complete a swing from left to right. The radar 2 and cameras 3 are settled on the worm and worm wheel mechanism, so the radar 2 and cameras 3 are able to be lifted, rotate and swing. The robot is able to operate in complicated situations.

The directional drilling lifting device 11, the radar 2 and the cameras 3 are connected by the first quick disconnect waterproof aviation female plug and male panel socket 14 and the second quick disconnect waterproof aviation female plug and male panel socket 15 as modules, which simplifies the assembly.

The present invention is uniformly controlled by the control system which is able to be a PC or other control devices.

The radar 2 comprises a radar antenna rear cover 21, a radar data acquisition board 22, a power supply board 23, a radar transmitter 23, a radar receiver 25, a radar detector 26, an antenna cover 27, an antenna base 28, a rear antenna base 29 and a metal cable fixed head 30. The radar data acquisition board 22, the power supply board 23, the radar transmitter 24 and the radar receiver 25 are settled inside the radar antenna rear cover 21. The rear antenna base 29 is connected to the radar antenna rear cover 21 by screws. The metal cable fixed head 30 is settled on the radar antenna rear cover 21. A radar detector 26 is settled inside the antenna base 28. The antenna cover 27 is connected to the antenna base 28 by screws. The antenna base 28 is connected to the rear antenna base 29 by screws. The radar 2 in the present embodiment is able to be other model type or in different structure as long as the inspection is able to be carried out smoothly.

The robot is able to inspect the pipeline with a diameter not less than DN300 mm. The robot is able to accurately target the defects inside the pipe. While operation, the robot is able to walk with a maximum speed of 1 m/s and the speed is able to be adjusted with continuous variable. The maximum obstacle climbing ability reaches 35 mm without difficulty.

The cameras 3 comprise camera shells 31, lens locking screw nut 32, tempered glass 33, lights 34 and rear camera base 35. The tempered glass 33 is placed ahead of the camera shell 31. The lens locking screw nut 32 is on the front of the camera shells 31 for locking the tempered glass 33. The lights 34 are on the left and right side of the camera shell 31 and are fixed by the screws. The rear of the camera shell 31 is settled and connected to the rear camera base 35 by screws. The cameras 3 in the present embodiment are able to be other model type or in different structure, as long as the inspection is able to be carried out smoothly.

The cameras 3 comprises high-resolution web camera (20× optical zoom) and CREE high brightness cold shadowless light, the two of which are adjusted to an ideal position to provide enough luminance for the cameras to shoot every corner inside of the pipeline. The cameras, lights and control panel are connected by quick disconnect waterproof aviation female plug and male panel socket, which are able to be replaced by different cameras components according to the situation of the pipelines.

Furthermore, in the embodiment the robot body 1 is filled with noble gases; a pressure sensor is inside the robot body 1; the pressure sensor electrically connects to the control system by the cable 16. A unitized mechanical seal is adopted to create and maintain a good sealing effect. The pressure sensor is able to detect the air pressure inside the robot body 1 and the directional drilling lifting device 11. The pressure sensor is also able to detect the air pressure inside the robot chassis in real time. When the pressure of the noble gases is out of range and is detected by the pressure sensor, the change in pressure inside the pipe is able to be detected by the control system and controlled by the control system to a certain degree. The safety of the robot inside the underground pipeline is thus guaranteed. The explosion and water invading are prevented.

Furthermore, in the present invention a tilt sensor is inside the robot body 1; the tilt sensor electrically connects to the control system by the cable 16. The tilt sensor is able to detect the inclination of the robot body 1 and analysis the angle of inclination by the control system. The robot body 1 is able to be adjusted before the overturn in time to prevent an overturn of the robot body 1.

Furthermore, in the present embodiment a safety ring for obstacle avoidance 4 is on a rear part of the robot body 1. The safety ring for obstacle avoidance 4 prevents the robot from hitting on the obstacles while moving backward and damages to the components on the robot. The safety ring 4 is the bearing point for the drag force of the cable 16, which prevent the damages and intermittent communication caused by the drag force on the cable 16.

Furthermore, in the present embodiment a cable clamp 5 is on the safety ring for obstacle avoidance 4; the cable 16 goes through and is fixed in the cable clamp 5. The cable clamp 5 further comprises a first clamping plate 51 and a second clamping plate 52; a through hole 53 is formed when the first clamping plate 51 pressed together with the second clamping plate 52; the cable 16 is pressed inside the through hole 53 and goes thought the first clamping plate 51 and the second clamping plate 52. The cable 16 is fixed and intermittent communication caused by dragging the cable 16 is avoided.

Furthermore, in the present embodiment the safety ring for obstacle avoidance 4 is connected to the cable clamp 5 by a locking device 6. A groove 61 is on the first clamping plate 51. An opening of the groove 61 is connected by fastener 62 which is a screw bolt or a latch. The first clamping plate 51 fits in the safety ring for obstacle avoidance 4 by the groove 61 and is fastened on the safety ring 4 by the screw bolt or the latch. The cable clamp 5 is thus connected to the safety ring for obstacle avoidance 4.

Furthermore, in the present embodiment a lifting ring 7 is on the front of the robot body 1 and is rotatable. The directional drilling lifting device 11 is on the lifting ring 7 and rotatable. The lifting ring 7 is adjustable to fix on the robot body 1 by the rotating bolt.

Furthermore, in the present embodiment the driving apparatus comprises at least two motors and at least four driving wheels 8; the motors and driving wheels 8 are places on two sides of the robot body 1; a differential drive is formed by driving wheels 8 placed on the two sides of the robot body 1 when the motors drive the respective driving wheels 8; The two motors are both high power and torque. The motors drive bevel gear transmission mechanism. The chain transmission mechanism rotates to drive the driving wheels 8 on the two sides of the robot body 1 to rotate and walk. The two motors are controlled independently to realize differential drive and enable the robot to turn on the spot.

Furthermore, in the present embodiment each of the driving wheels 8 comprises an aluminum main body face of which is filled with protection sleeve 81 which adopts PU pouring and natural rubber to prevent erosion, and improve acid and alkali resistance and endurance.

Furthermore, in the present embodiment rounded angles 82 are chamfered the driving wheels 8 on a far end of the robot body 1. The curved faces of the rounded angle 82 tightly fit the curve of the pipeline. Specifically, the rounded angle 82 is chamfered on the end of the protection sleeve 81. Sludge conduits are evenly distributed on the surface of the protection sleeve 81 to remove sludge on the driving wheel 8 while the driving wheel 8 is rolling inside the pipe and prevent the driving wheel 8 from being slippery.

The embodiment is just exemplary for illustrating the present invention and not a limitation. All the equal transformation in structure based on the specification and drawings of the present invention and direct or indirect applications in related field without bias from the contriving of the present invention are within the protection scope of the present invention.

What is claimed is:

1. A pipeline radar and television inspection robot, comprising: a robot body, a directional lifting device, a directional rotary device, a directional swing device, a radar, a camera and a driving apparatus;

wherein the directional lifting device is on a front part of the robot body; the directional rotary device is on the directional lifting device; the directional swing device is on the directional rotary device; the radar and the camera are on the directional swing device; the driving apparatus is on a bottom of the robot body;

wherein the directional lifting device is plugged in the robot body by a first disconnect waterproof aviation female plug and male panel socket;

wherein the radar and the camera are plugged in the robot body by a second disconnect waterproof aviation female plug and male panel socket; the robot body electrically connects to cables which electrically connect to a control system;

wherein the directional lifting device further comprises a four-bar linkage connected in a loop, and a first motor; wherein one end of the four-bar linkage is connected to the robot body; the first motor is plugged in the robot body by the first disconnect waterproof aviation female plug and male panel socket;

wherein the directional rotary device further comprises a planetary gear which is mounted and revolves around a second motor; the second motor is set on the four-bar linkage; the second motor electrically connects to the robot body;

wherein the directional swing device further comprises a worm and worm wheel mechanism which is connected to a third motor to transmit force; the third motor is connected to a movable arm of the planetary gear; the third motor electrically connects to the robot body.

\* \* \* \* \*